US007039066B2

(12) United States Patent
Suzuki et al.

(10) Patent No.: US 7,039,066 B2
(45) Date of Patent: May 2, 2006

(54) DYNAMIC BANDWIDTH ASSIGNMENT SYSTEM AND DYNAMIC BANDWIDTH ASSIGNMENT METHOD CAPABLE OF REDUCING CELL TRANSMISSION DELAY

(75) Inventors: Takamasa Suzuki, Tokyo (JP); Minoru Akita, Tokyo (JP); Yoshihiro Asashiba, Tokyo (JP); Seiji Kozaki, Tokyo (JP); Tetsuya Yokotani, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 796 days.

(21) Appl. No.: 09/880,115

(22) Filed: Jun. 14, 2001

(65) Prior Publication Data
US 2001/0055314 A1 Dec. 27, 2001

(30) Foreign Application Priority Data
Jun. 16, 2000 (JP) ............................ 2000-182090

(51) Int. Cl.
*H04J 3/16* (2006.01)
(52) U.S. Cl. ................ 370/468; 370/347; 370/395.21; 370/442
(58) Field of Classification Search ............... 370/442, 370/348, 347, 412, 428, 416, 397
See application file for complete search history.

(56) References Cited

U.S. PATENT DOCUMENTS

| 4,779,267 A | | 10/1988 | Limb |
|---|---|---|---|
| 4,914,650 A | * | 4/1990 | Sriram ........................ 370/235 |
| 4,980,886 A | * | 12/1990 | Bernstein .................... 370/433 |
| 5,463,620 A | * | 10/1995 | Sriram ........................ 370/412 |
| 5,748,629 A | * | 5/1998 | Caldara et al. ............. 370/389 |
| 5,784,358 A | * | 7/1998 | Smith et al. ................ 370/230 |
| 5,940,397 A | * | 8/1999 | Gritton ........................ 370/412 |
| 6,016,311 A | * | 1/2000 | Gilbert et al. .............. 370/280 |
| 6,088,360 A | * | 7/2000 | Amaral et al. .............. 370/412 |
| 6,400,714 B1 | * | 6/2002 | Motyka et al. ............. 370/376 |
| 6,459,681 B1 | * | 10/2002 | Oliva ........................... 370/232 |
| 6,466,541 B1 | * | 10/2002 | Peck ........................... 370/229 |
| 6,470,016 B1 | * | 10/2002 | Kalkunte et al. ...... 370/395.41 |
| 6,577,641 B1 | * | 6/2003 | Izumi .......................... 370/442 |

FOREIGN PATENT DOCUMENTS

| JP | 7-135502 | 5/1995 |
|---|---|---|
| WO | WO 97/35410 | 9/1997 |
| WO | WO 97/46015 | 12/1997 |

* cited by examiner

*Primary Examiner*—Brian Nguyen
*Assistant Examiner*—Tri H. Phan
(74) *Attorney, Agent, or Firm*—Oblon, Spivak, McClelland, Maier & Neustadt, P.C.

(57) ABSTRACT

A dynamic bandwidth assignment system includes a network unit for carrying out cell slot assignment, and a network termination for transmitting cells to the network unit by means of cell slots assigned by the network unit. When the number of consecutive valid cells the network unit receives from the network terminations exceeds a predetermined threshold value, the network unit increases the number of the cell slots to be assigned to the network termination. The system can solve a problem of a conventional system in that it is unavoidable that a cell transfer delay and a bursting tendency of cells are statistically increased.

8 Claims, 10 Drawing Sheets

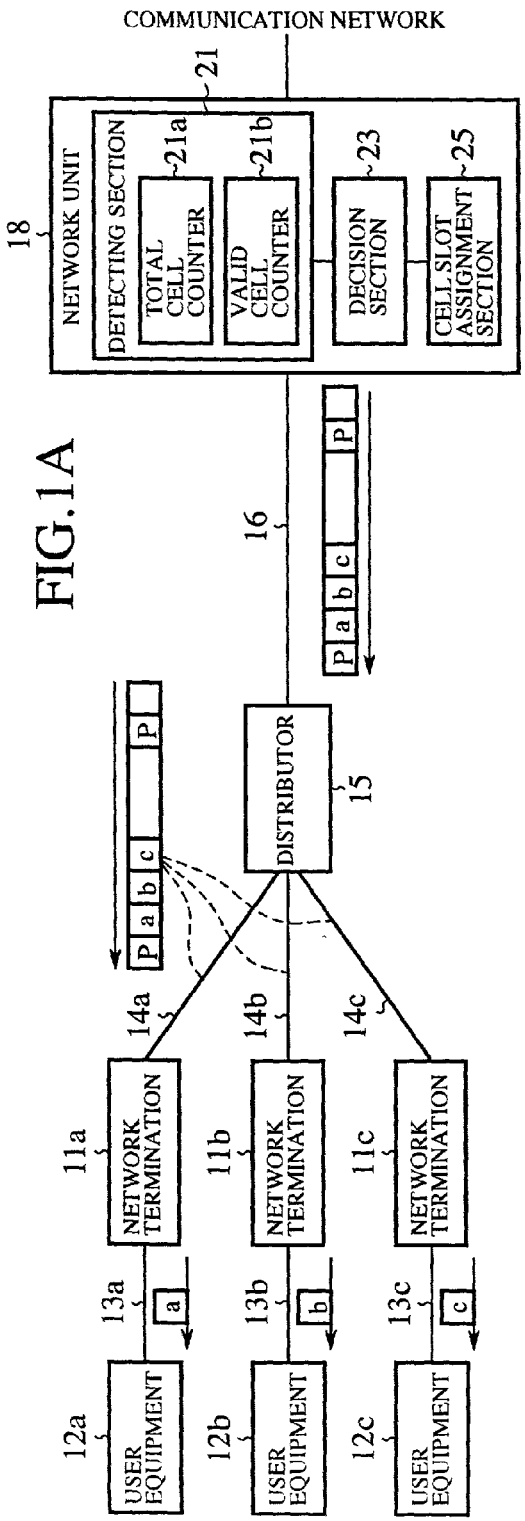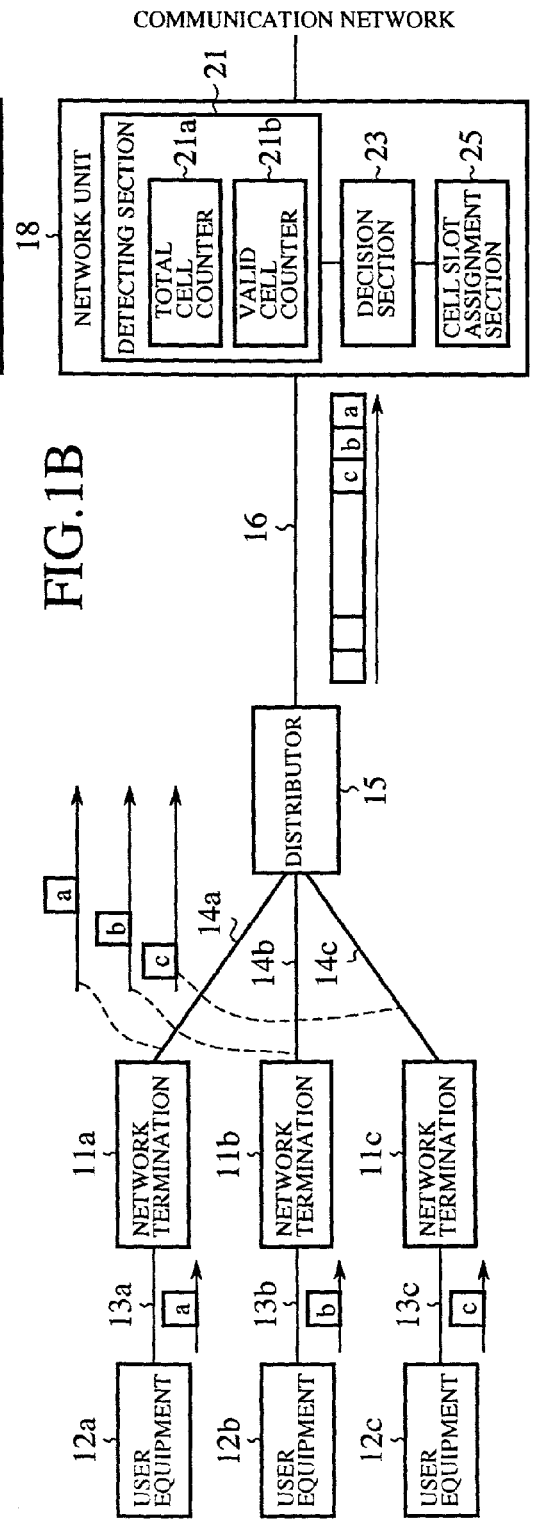

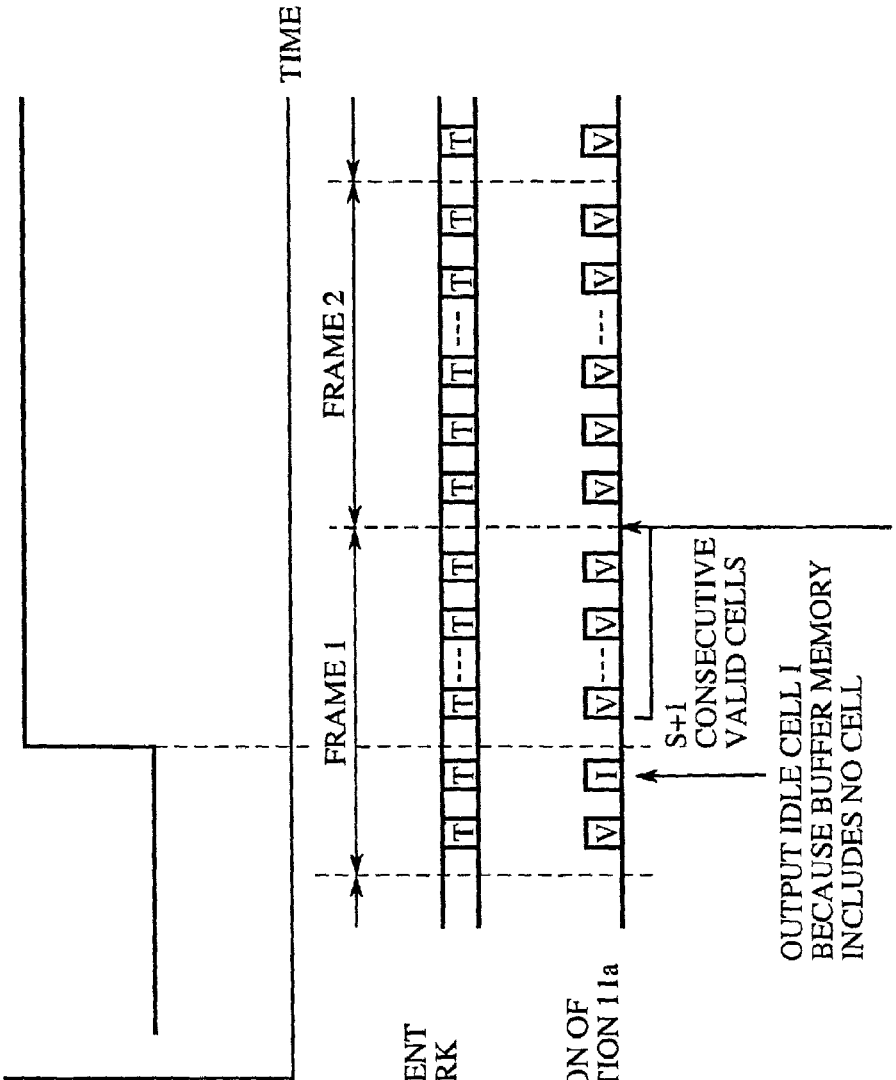

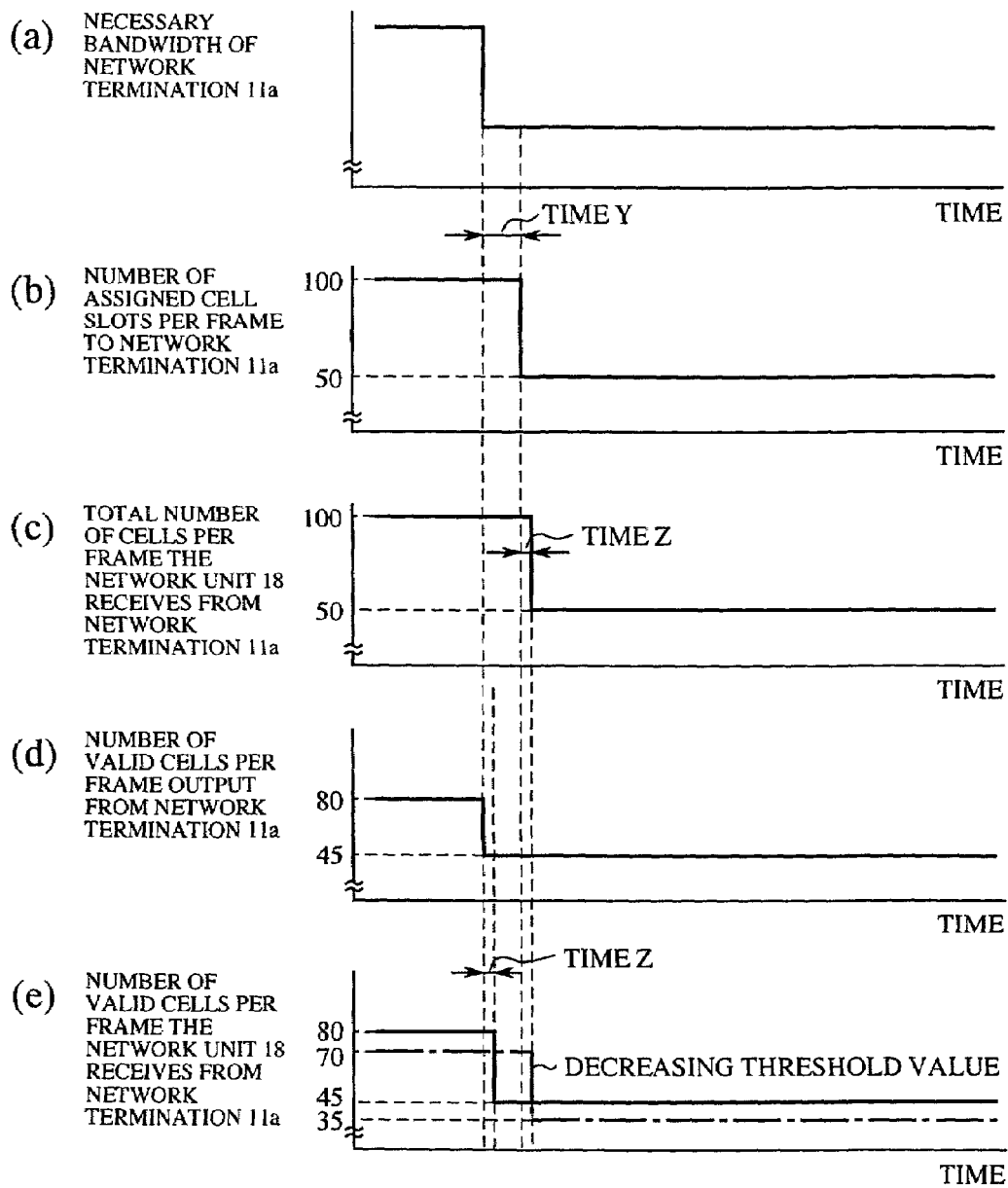

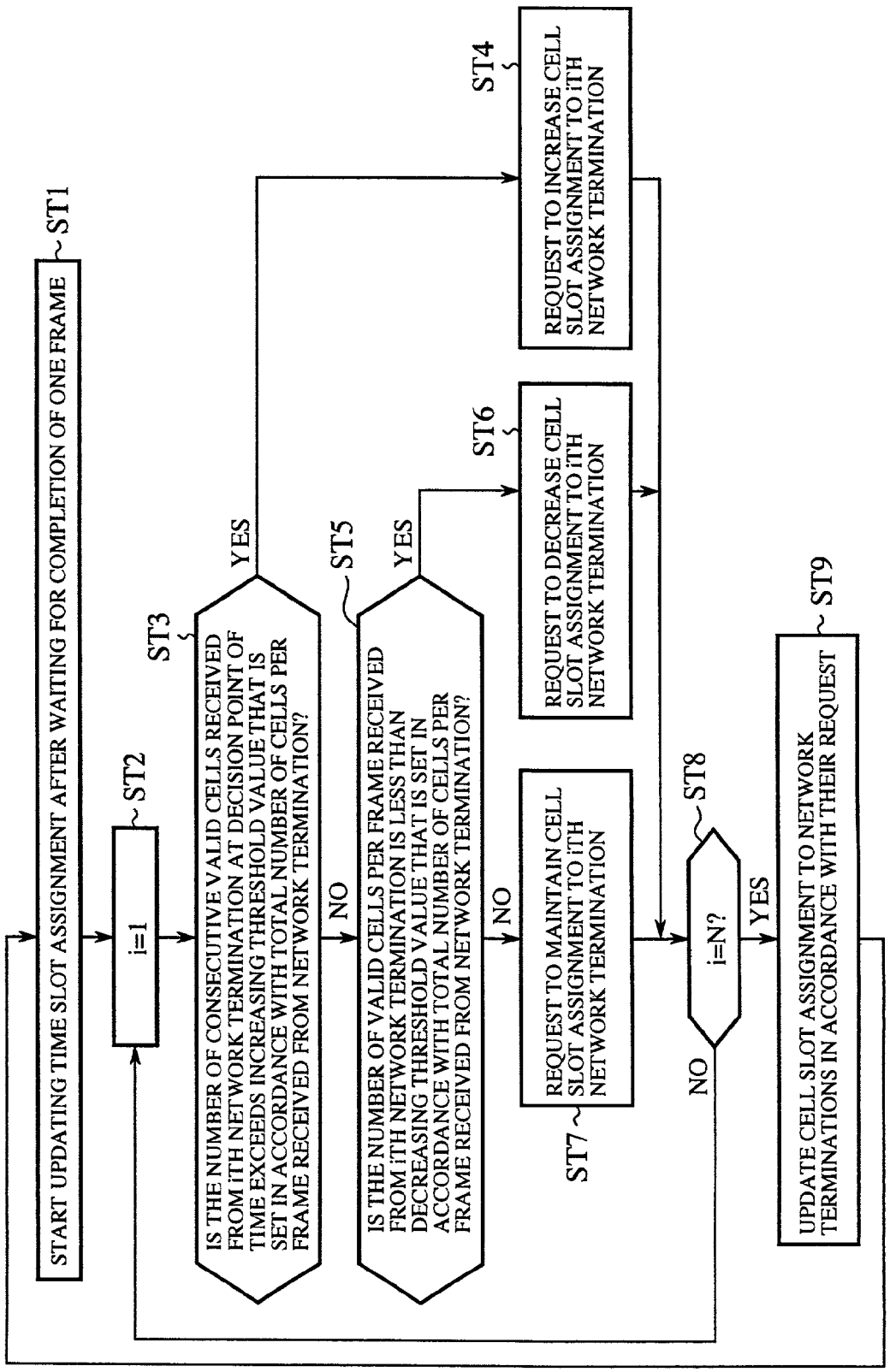

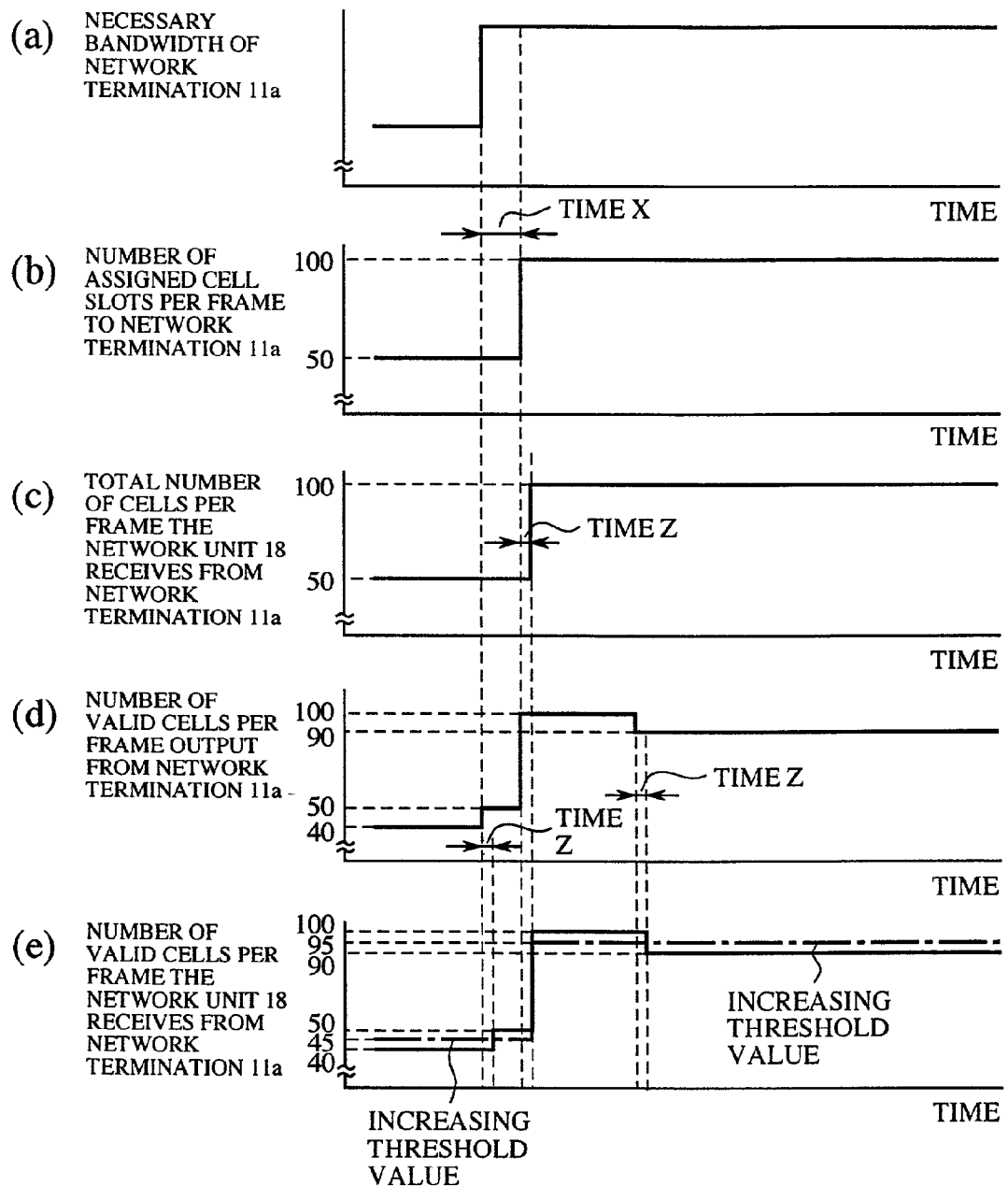

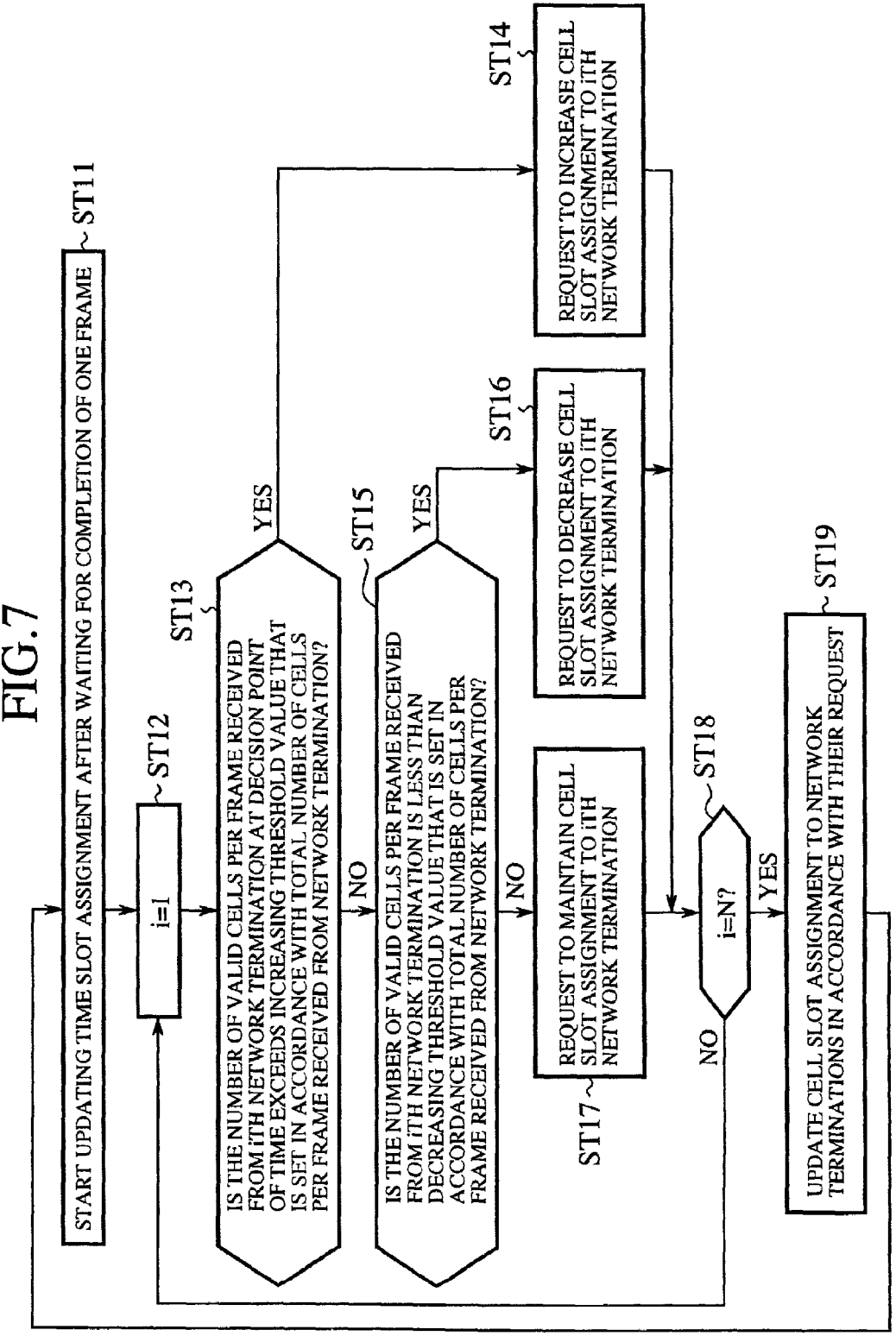

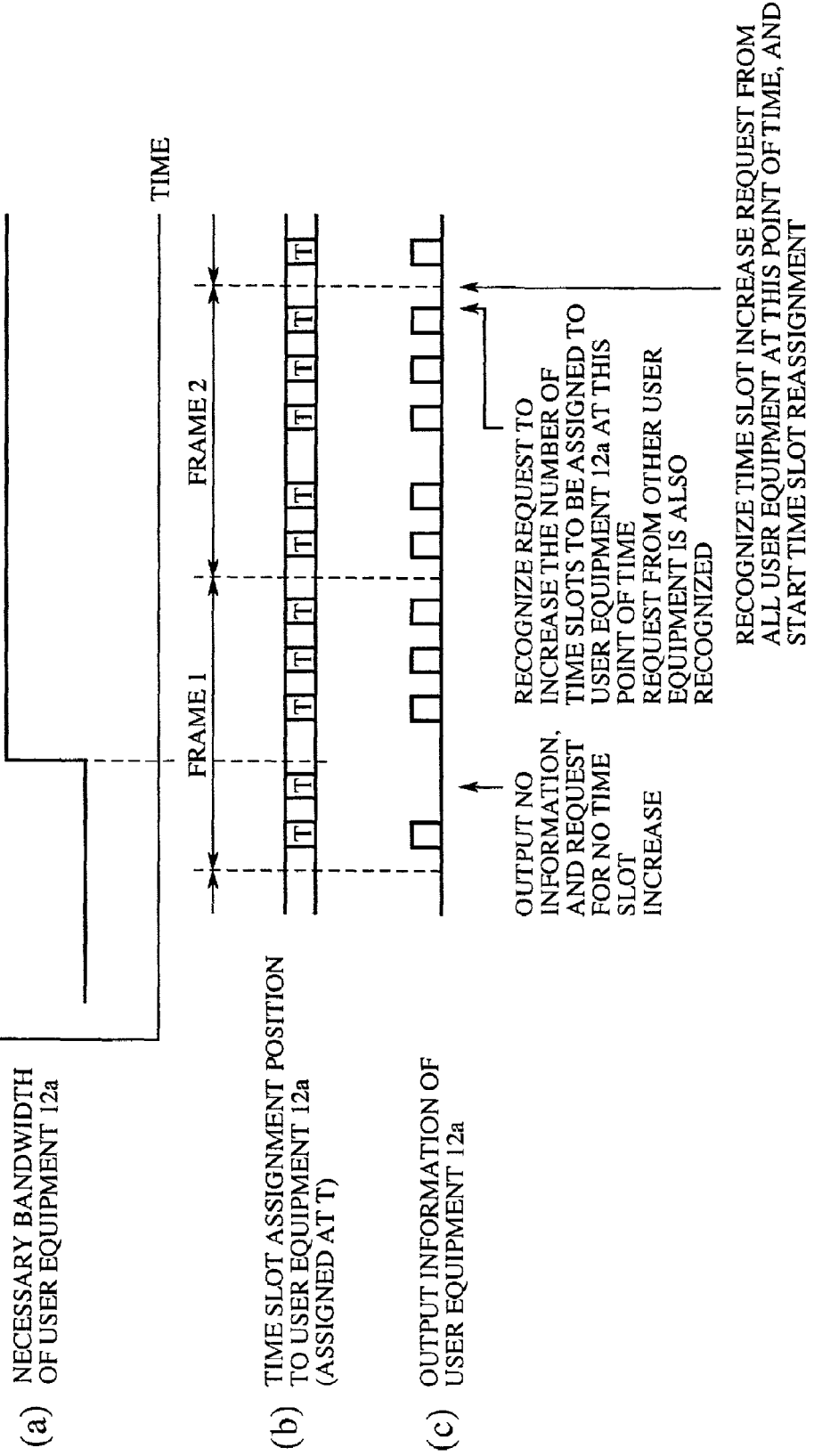

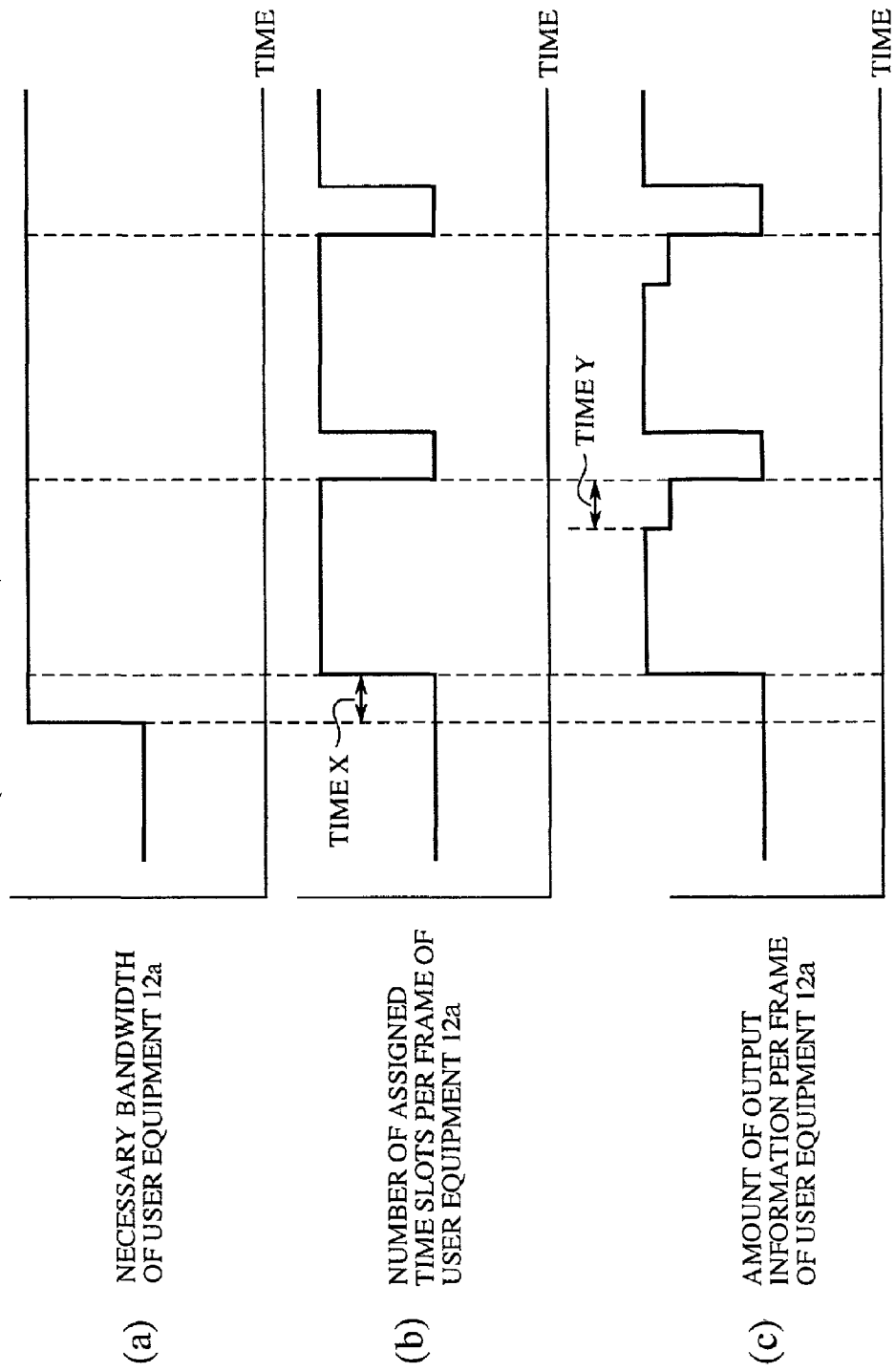

DYNAMIC BANDWIDTH ASSIGNMENT SYSTEM AND DYNAMIC BANDWIDTH ASSIGNMENT METHOD CAPABLE OF REDUCING CELL TRANSMISSION DELAY

BACKGROUND OF THE INVENTION

1. Field of the Invention

The present invention relates to an FSAN (Full Service Access Network) and an ATM-PON (Asynchronous Transfer Mode-Passive Optical Network) which is under international standardization by ITU-T (International Telecommunication Union-Telecommunication Standardization Sector), and particularly to a dynamic bandwidth assignment system and a dynamic bandwidth assignment method for carrying out dynamic bandwidth assignment of the uplink band from a network termination to a network unit in these networks.

2. Description of Related Art

FIGS. 8A and 8B are block diagrams showing a configuration of a conventional dynamic bandwidth assignment system disclosed in Japanese patent application laid-open No. 7-135502, for example. In these figures, reference numerals 12a, 12b and 12c each designate user equipment; 14a, 14b and 14c each designate a transmission line; 15 designates a distributor; 16 designates a transmission line; and 17 designates a network unit. The user equipment 12a, 12b and 12c is connected to the distributor 15 via the transmission lines 14a, 14b, 14c, and the distributor 15 is connected to the network unit 17 via the transmission line 16. FIG. 8A shows the flow of downlink signals from the network unit 17 to the user equipment 12a, 12b and 12c, whereas FIG. 8B shows the flow of uplink signals from the user equipment 12a, 12b and 12c to the network unit 17.

Next, the operation of the conventional system will be described.

In FIG. 8A, the network unit 17 transmits a frame identifier F, followed by supplying the transmission line 16 with information a to the user equipment 12a, information b to the user equipment 12b, and information c to the user equipment 12c. The information a, b and c consists of information items the network unit 17 receives from a communication network. The network unit 17 provides the information items a, b and c with user equipment information about the destinations.

The distributor 15 supplies all the transmission lines 14a, 14b and 14c with the same signal. The user equipment 12a, 12b and 12c each receives the signal from the transmission lines 14a, 14b and 14c, and extracts the information addressed to itself. The frame identifier F in FIG. 8A has information indicating the time slots to be used in the next uplink frame by the user equipment 12a, 12b and 12c as shown in FIG. 8B.

In FIG. 8B, the user equipment 12a, 12b and 12c each recognizes its own time slots from the frame identifier F in FIG. 8A, and supplies the time slots with the information items a, b and c, respectively.

Incidentally, in order to increase the number of time slots to be transmitted, the user equipment 12a, 12b and 12c supplies the information to all the time slots assigned. As for the frame identifier F, it can be always transmitted by the user equipment 12a, for example.

The distributor 15 supplies the transmission line 16 with the information items a, b and c in this order. When the transmission lines 14a, 14b and 14c and the transmission line 16 consist of an optical fiber, an optical star coupler can be used as the distributor 15. The network unit 17 receives the frame identifier F and information items a, b and c from the transmission line 16, and transfers them to the communication network.

Receiving the entire information of a frame, the network unit 17 makes a decision as to whether all the time slots assigned to the equipment 12a, 12b or 12c of each user carry the information, and when the decision result is positive, it increases the number of the time slots assigned to the user equipment, whereas when the decision result is negative, it decreases or holds the number of the time slots, and the information about the increase or decrease is added to the uplink frame identifier F of FIG. 8A.

Thus, the network unit 17 can increase the number of the time slots to be assigned to the user equipment that requires the increase of the uplink time slots.

With the foregoing configuration, the conventional dynamic bandwidth assignment system has a problem of statistically increasing a cell transfer delay and a bursting tendency of a cell.

Here, the problem will be described in more detail taking an example of the user equipment 12a, which problem also holds true for the user equipment 12b or 12c.

FIG. 9 is a diagram illustrating relationships between assignment positions of time slots and output information in reference to the necessary bandwidth of the user equipment 12a. In FIG. 9, frames 1 and 2 are named so for the convenience of explanation, and the frame identifier F is omitted from the output information of the user equipment 12a.

FIG. 9 illustrates an example where the user equipment 12a makes a request for increasing its necessary bandwidth at a midpoint in the frame 1. As typical services that request an increase or decrease of the necessary bandwidth, there are such services as data transmission of videos, data transmission by computers, etc. In the example of FIG. 9, the user equipment 12a halts the output of the information at the assigned time slot before the request for increasing the necessary bandwidth because it does not need to increase the number of the time slots before the request, but after that it supplies the information to all the assigned time slots because of the increase of the necessary bandwidth.

However, it is not until the network unit 17 receives the final information in frame 2 from the user equipment 12a that it can recognize the request to increase the number of time slots from the user equipment 12a, because the user equipment 12a does not transmit its information in the time slot in frame 1. Waiting for the arrival of the frame 2 in its entirety, the network unit 17 also recognizes the request to increase the number of time slots from other user equipment, and starts the reassignment of the time slots. When completing the reassignment, the network unit 17 provides the downlink frame identifier F with time slot information. Receiving the time slot information, the user equipment 12a can output its information to the reassigned time slots from the next uplink frame.

As described above, it takes one to two frame periods for the network unit 17 to start the reassignment of the time slots in response to the request to increase the necessary bandwidth from the user equipment. Generally, when the user equipment is not assigned necessary time slots, it stores the information to be transmitted in its buffer memory. Thus, the delay of the reassignment of the time slots will increase the capacity of the buffer memory, along with the amount of information to be stored in the buffer, resulting in an increase in the transfer delay. Besides, the increase in the number of cells stored in the buffer increases the bursting tendency of the cells. Since a larger capacity buffer memory is usually required to transmit the information with high bursting tendency through the communication network, it is preferable for the equipment of the communication network to transmit information with low bursting tendency.

Next, FIG. 10 is a diagram illustrating relationships between the number of time slots assigned to the user equipment 12a and the amount of the output information of the user equipment 12a when the necessary bandwidth of the user equipment 12a is increased and held thereafter. In FIG. 10, there are shown two delay times: a delay time X between the time when the user equipment 12a makes a request to increase the number of the time slots and the time when it actually outputs its information using the time slots with their number being increased, and a delay time Y between the time when the user equipment 12a halts the request to increase the number of the time slots and the time when it actually transmits its information using the time slots with their number being reduced. Thus, when the necessary bandwidth of the user equipment 12a is increased, the number of the time slots assigned to the user equipment 12a is increased after the time X, and hence the amount of the output information of the user equipment 12a is increased.

For convenience of explanation, it is further assumed that the bandwidth of the time slots whose number is increased satisfies the necessary bandwidth of the user equipment 12a, and that when all the time slots assigned are not supplied with the information, the number of the time slots assigned is decreased without exception.

Afterward, when the user equipment 12a transmits the entire information stored in the buffer memory, it does not supply all the assigned time slots with its information. In response to this, the network unit 17 decides that it can reduce the number of time slots to be assigned to the user equipment 12a, and actually reduces the number of the time slots after the time period Y. Thus, the amount of the output information of the user equipment 12a is further decreased, and the information is stored in the buffer memory, again. The operation is repeated until the necessary bandwidth of the user equipment 12a is reduced.

The delay time increases with an increase of the amount of information in the buffer memory. The foregoing operation brings about the states alternately where a large amount and a small amount of information is transmitted, thereby increasing the bursting tendency of the cells.

SUMMARY OF THE INVENTION

The present invention is implemented to solve the foregoing problem. It is therefore an object of the present invention to provide a dynamic bandwidth assignment system and a dynamic bandwidth assignment method capable of statistically reducing the cell transfer delay and the bursting tendency of the cells.

According to a first aspect of the present invention, there is provided a dynamic bandwidth assignment system including a network unit for carrying out cell slot assignment, and a network termination for transmitting cells to the network unit by means of cell slots assigned by the network unit, the network unit comprising: a detecting section for detecting a number of valid cells the network unit receives from the network termination; a decision section for outputting a decision result in accordance with the number of valid cells; and a cell slot assignment section for controlling the cell slot assignment to the network termination in response to the decision result of the decision section.

Here, the decision section may supply its decision result to the cell slot assignment section when a number of consecutive valid cells the network unit receives from the network termination exceeds a first predetermined threshold value, and the cell slot assignment section may increase the number of the cell slots to be assigned to the network termination in response to the decision result.

The decision section may supply its decision result to the cell slot assignment section when a number of valid cells the network unit receives from the network termination in a decision period becomes less than a second predetermined threshold value, and the cell slot assignment section may reduce a number of the cell slots to be assigned to the network termination in response to the decision result.

The decision section may supply its decision result to the cell slot assignment section when a number of valid cells the network unit receives from the network termination in a decision period exceeds a first predetermined threshold value, and the cell slot assignment section may increase a number of the cell slots to be assigned to the network termination in response to the decision result.

The decision section may determine the first threshold value and the second threshold value in accordance with the total number of cells the network unit receives from the network termination in the decision period.

According to a second aspect of the present invention, there is provided a dynamic bandwidth assignment method in a network unit comprising the steps of: producing a decision result in accordance with a number of valid cells the network unit receives from a network termination; and controlling cell slot assignment to the network termination in response to the decision result.

Here, when a number of consecutive valid cells the network unit receives from the network termination exceeds a first predetermined threshold value, the step of controlling cell slot assignment may increase the number of the cell slots to be assigned to the network termination in response to the decision result.

When a number of the valid cells the network unit receives from the network termination becomes less than a second predetermined threshold value, the step of controlling cell slot assignment may decrease the number of the cell slots to be assigned to the network termination in response to the decision result.

When a number of the valid cells the network unit receives from the network termination exceeds a first predetermined threshold value, the step of controlling cell slot assignment may increase the number of the cell slots to be assigned to the network termination in response to the decision result.

The first threshold value and the second threshold value may be determined in accordance with the total number of cells the network unit receives from the network termination in the decision period.

BRIEF DESCRIPTION OF THE DRAWINGS

FIGS. 1A and 1B are block diagrams showing a configuration of an embodiment 1 of a dynamic bandwidth assignment system in accordance with the present invention;

FIG. 2 is a diagram illustrating relationships between the necessary bandwidth of a network termination, cell slot positions assigned to the network termination, and the output information of the network termination;

FIG. 3 is a diagram illustrating relationships between the necessary bandwidth of a network termination, the number of assigned cell slots per frame of the network termination, the total number of cells per frame received by the network unit from the network termination, the number of valid output cells per frame of the network termination and the number of valid cells per frame received by the network unit from the network termination;

FIG. 5 is a flowchart illustrating a dynamic bandwidth assignment method in the embodiment 1;

FIG. 6 is a diagram illustrating relationships between the necessary bandwidth of a network termination, the number of assigned cell slots per frame of the network termination, the total number of cells per frame received by the network unit from the network termination, the number of valid output cells per frame of the network termination and the number of valid cells per frame received by the network unit from the network termination;

FIG. 7 is a flowchart illustrating a dynamic bandwidth assignment method in an embodiment 2 in accordance with the present invention;

FIG. 9 is a diagram illustrating relationships between assignment positions of the time slots and output information with respect to a necessary bandwidth of the user equipment; and FIG. 10 is a diagram illustrating relationships between the number of time slots assigned to the user equipment and the amount of output information of the user equipment.

DETAILED DESCRIPTION OF THE PREFERRED EMBODIMENTS

Figure 4:
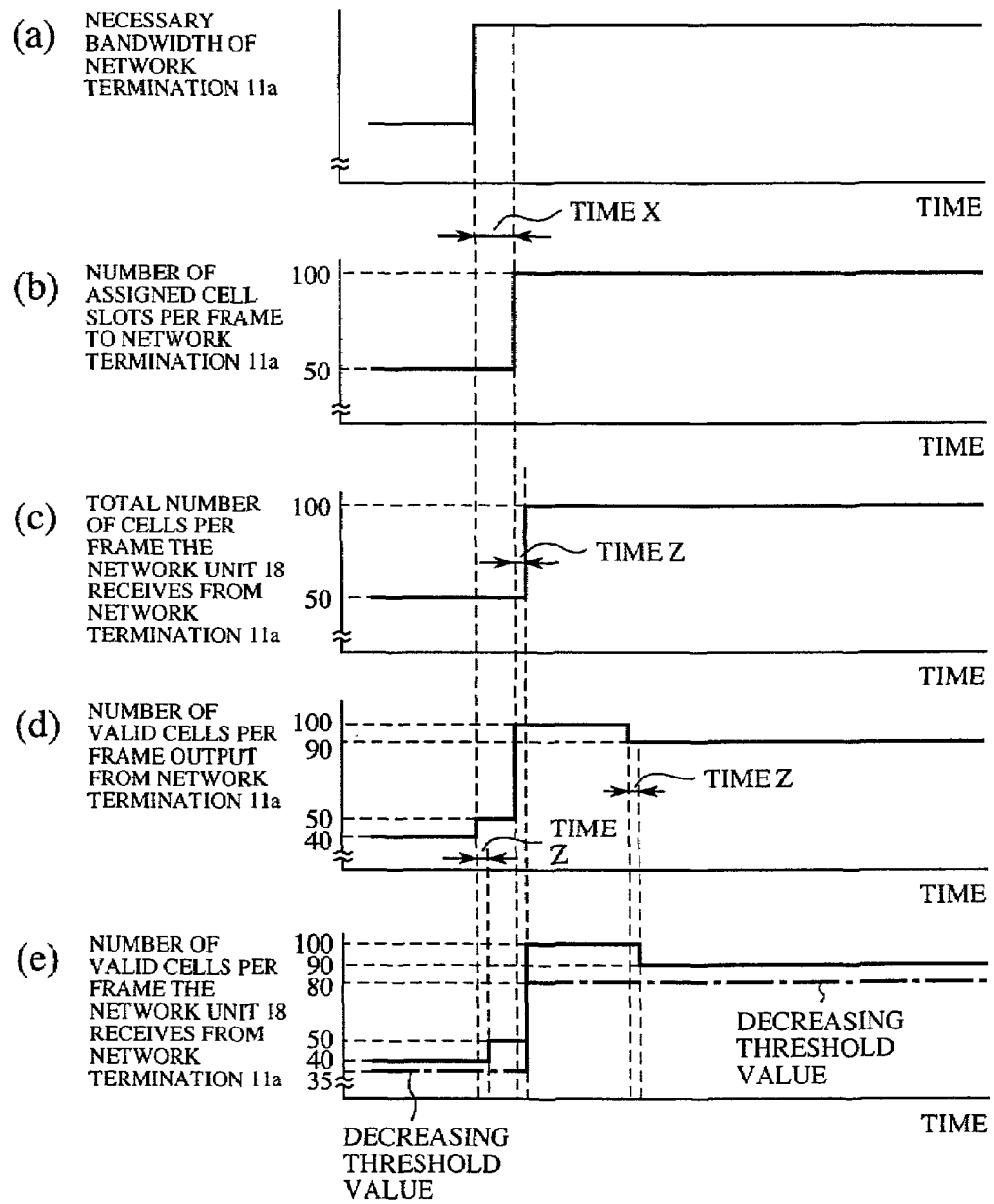
FIG. 4 is a diagram illustrating relationships between the necessary bandwidth of a network termination, the number of assigned cell slots per frame of the network termination, the total number of cells per frame received by the network unit from the network termination, the number of valid output cells per frame of the network termination and the number of valid cells per frame received by the network unit from the network termination.

The invention will now be described with reference to the accompanying drawings.

Embodiment 1

FIGS. 1A and 1B are block diagrams showing a configuration of an embodiment 1 of a dynamic bandwidth assignment system in accordance with the present invention. In these figures, reference numerals 11a, 11b and 11c each designate a network termination for transmitting cells to a network unit 18 using cell slots assigned by the network unit 18; 12a, 12b and 12c each designate user equipment; 13a, 13b and 13c each designate a transmission line; 14a, 14b and 14c each designate transmission line; 15 designates a distributor; 16 designates a transmission line; and 18 designates the network unit. The network unit 18 comprises a detecting section 21, a decision section 23 and a cell slot assignment section 25. The detecting section includes a total cell counter 21a for counting the number of the cells received from the network terminations 11a, 11b or 11c in a predetermined decision period, and a valid cell counter 21b for counting the number of valid cells. The decision section 23 makes a decision as to whether the number of consecutive valid cells exceeds a first predetermined threshold value, or the number of valid cells received in the decision period drops below a second predetermined threshold value. The cell slot assignment section 25 assigns an increasing number of cell slots to the network termination 11a, 11b or 11c when the number of the consecutive valid cells received from it exceeds the first predetermined threshold value, and assigns a decreasing number of cell slots to it when the number of valid cells received from it in the decision period reduces below the second predetermined threshold value.

The decision section 23 can make the decision about the increase or decrease in the number of cell slots at every single frame or several frame interval. In the following description, it is assumed that it makes the decision frame by frame.

Figure 8A:
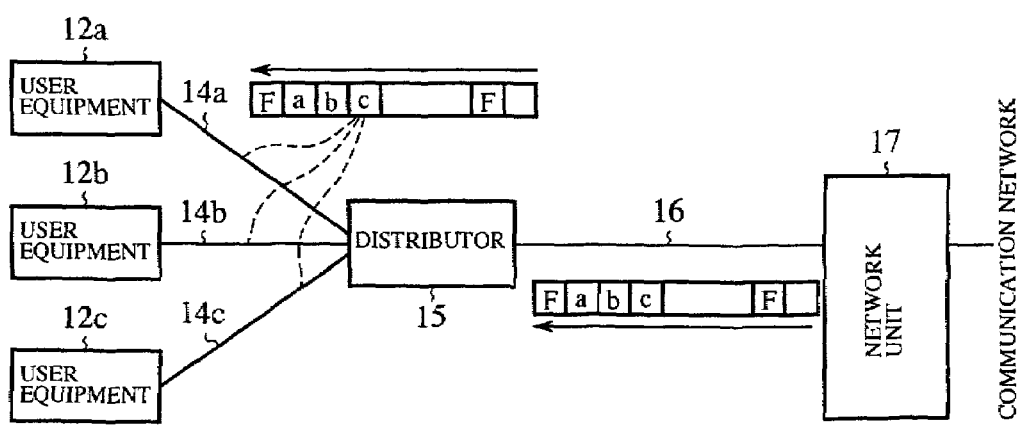
FIGS. 8A and 8B are block diagrams showing a configuration of a conventional dynamic bandwidth assignment system.
Figure 8B:
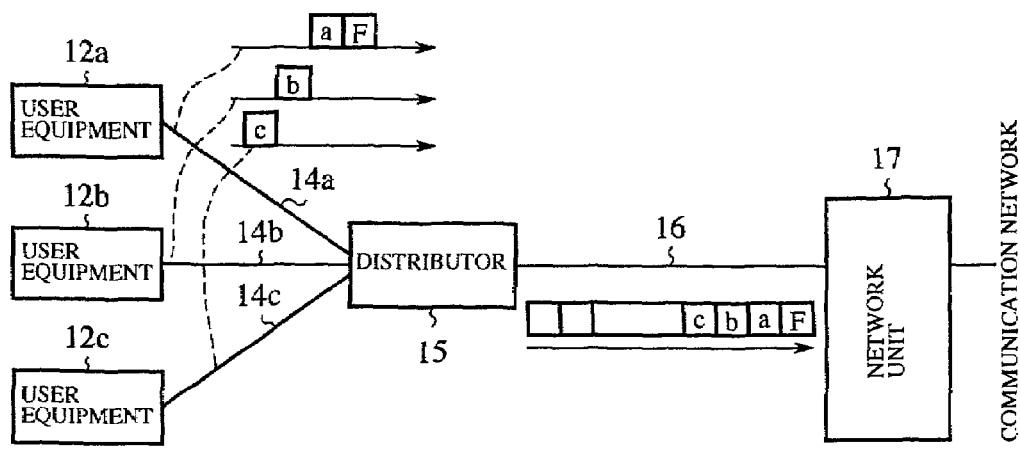

The user equipment 12a, 12b and 12c, which is described in the conventional technique in connection with FIGS. 8A and 8B, is individually connected to the network termination as shown in FIGS. 1A and 1B in the present embodiment 1: The network termination 11a is connected to the user equipment 12a ; the network termination 11b to the user equipment 12b ; and the network termination 11c to the user equipment 12c because such configuration is practically used in the current ATM-PON. The network terminations 11a, 11b and 11c currently provide user-network interface for the user equipment 12a, 12b and 12c as equipment on a carrier network side.

The user equipment 12a, 12b and 12c is each connected to the network terminations 11a, 11b and 11c via the transmission lines 13a, 13b and 13c. The network terminations 11a, 11b and 11c are connected to the distributor 15 via the transmission lines 14a, 14b and 14c. The distributor 15 is connected to the network unit 18 via the transmission line 16.

FIG. 1A shows a flow of downlink signals from the network unit 18 to the user equipment 12a, 12b and 12c, whereas FIG. 1B shows a flow of uplink signals from the user equipment 12a, 12b and 12c to the network unit 18. In the present embodiment 1, it is assumed that symbols a, b and c in a frame in FIGS. 1A and 1B designate a cell because information is transmitted using a fixed length packets called cells in the ATM-PON, though these symbols are assumed to designate information items in the conventional technique.

Next, the operation of the present embodiment 1 will be described.

In FIG. 1A, the network unit 18 transmits a PL-OAM (Physical Layer-Operation and Maintenance) cell P, followed by supplying the transmission line 16 with a cell a to the network termination 11a, a cell b to the network termination 11b, and a cell c to the network termination 11c, successively. The cells a, b and c are those the network unit 18 receives from the communication network, and include user equipment information about their destinations.

The distributor 15 supplies the transmission lines 14a, 14b and 14c with the same signal as it receives via the transmission line 16. The network terminations 11a, 11b and 11c each receive the signal from the transmission lines 14a, 14b and 14c, and extracts from it the information directed to themselves, thereby transmitting the cells a, b and c to the user equipment 12a, 12b and 12c, respectively.

The PL-OAM cell P in FIG. 1A includes information indicating cell slot positions the network terminations 11a, 11b and 11c utilize from the next frames in the uplink transmission in FIG. 1B. Although a cell slot is assumed to be a time slot in the conventional technique, it is handled as the cell slot itself because the ATM-PON uses cells. In addition, although the PL-OAM cells are output once in a frame in FIGS. 1A and 1B, they are output multiple times in a single frame, and the PL-OAM cell at the initial position of the frame can be identified from the information inserted into the cell.

In FIG. 1B, the user equipment 12a, 12b and 12c supplies cells a, b and c to the network terminations 11a, 11b and 11c.

The network terminations 11a, 11b and 11c, recognizing from the PL-OAM cell shown in FIG. 1A the cell slots assigned to them to transmit their own information, and supplies the cell slots with the cells a, b and c. Here, the bandwidths of the cells the network terminations 11a, 11b and 11c receive from the user equipment 12a, 12b and 12c differ from those of the cells they transmit to the distributor 15 in the short term, although they become equal in the long term.

The network terminations 11a, 11b and 11c each include a buffer memory for storing the cells to absorb the difference in the bandwidth in the short term between the cells received from the user equipment 12a, 12b and 12c and the cells transmitted to the distributor 15. As long as the buffer memories store cells, the network terminations 11a, 11b and 11c transmit valid cells using all the cell slots assigned to them. In contrast, while the buffer memories store no cell, they output idle cells to the cell slots assigned. Although the idle cells take a form of a cell, they do not carry any information.

The distributor 15 supplies the transmission line 16 with the cells a, b and c in this order. When the transmission lines 14a, 14b and 14c and the transmission line 16 are an optical fiber, an optical star coupler is used as the distributor 15. The network unit 18 receives the cells a, band c from the transmission line 16, and transfers them to the communication network. Although the PL-OAM cell is not provided in the uplink transmission, this frame identifier is not necessary because the network unit 18 measures the delay of the uplink frame with respect to the downlink frame in advance in the ATM-PON, and handles the cell that arrives at the network unit 18 when the delay time has elapsed after the transmission of the PL-OAM cell at the initial position of the downlink frame, as the initial cell of the uplink frame.

Subsequently, receiving the entire information of the frame, the network unit 18 supervises the received cells for each of the network terminations 11a, 11b and 11c, carries out the assignment of cell slots, and inserts the information about the assignment into the downlink PM-OAM cells P as shown in FIG. 1A.

Next, the cell slot assignment will be described in detail. Although the operation of the user equipment 12a in connection with the network termination 11a will be described in the following, the operation of the user equipment 12b and network termination 11b and that of the user equipment 12c and network termination 11c are the same.

(1) First, the case will be described where the bandwidth of the cells output by the user equipment 12a is increased.

An increasing bandwidth of the cells output from the user equipment 12a will increase the uplink bandwidth required by the network termination 11a. FIG. 2 is a diagram illustrating relationships between the bandwidth required by the network termination 11a, cell slot positions assigned to the network termination 11a, and the output information of the network termination 11a.

In FIG. 2, before increasing its necessary bandwidth, the network termination 11a has completed the transmission of all the cells in its buffer, and outputs an idle cell. Subsequently, the bandwidth of the cells output from the user equipment 12a is increased, and hence the valid cells are output successively.

It is assumed here that S (cells) is the threshold value of the number of consecutive valid cells determined in accordance with the total number of the cells the network termination 11a receives from the user equipment 12a by the point of time at which a decision is made about whether to increase the number of cell slots to be assigned to the network termination 11a. In the case of FIG. 2, S+1 valid cells continue, which exceeds the threshold value S. Therefore, the network unit 18 starts the increase in the number of cell slots to be assigned to the network termination 11a. Here, the threshold value is referred to as an increasing threshold value because it is used to increase the number of the cell slots.

The increase of the other network terminations is decided in the same manner.

Since the cell slots assigned to the network termination 11a are provided with either the valid cell or idle cell of the network termination 11a without fail, the number of the cell slots assigned to the network termination 11a in a single frame equals the total number of cells per frame that the network unit 18 receives from the network termination 11a after the fixed delay time.

Since the decision section 23 determines the increasing threshold value of the number of consecutive valid cells in accordance with the total number of cells per frame, the increasing threshold value varies in response to the total number of the cells received.

The total number of received cells and the number of valid cells are counted as follows.

The detecting section 21 of the network unit 18 recognizes the cell that arrives at the point of time when the delay time measured in advance has elapsed after transmitting the initial PL-OAM of the downlink frame, as the initial cell of the uplink frame. Since the network unit 18 knows the positions of the cell slots assigned to the network termination 11a in the frame, the detecting section 21 can recognize the cell time at which it receives the cells from the network termination 11a.

At the time it receives the cells from the network termination 11a, the detecting section 21 counts the total number of the cells and the number of valid cells as follows. First, it causes the total cell counter 21a to count the total number of the cells of the network termination 11a. Then, detecting the valid cells by referring to the ATM cell header, it causes the valid cell counter 21b to count the number of the valid cells of the network termination 11a.

It is necessary for the network unit 18 to assign the cell slots as even as possible to reduce the bursting tendency of the cells. In this case, when the necessary bandwidth of the network termination is increased, the possibility that the network unit 18 can decide the increase in the number of the cell slots at the end of the frame is about L/K, where K is the number of the cell slots assigned to the network termination, and L is the increasing threshold value of the number of consecutive valid cells of the network termination at the time when the decision is made as to the increase of the cell slots.

Thus, the present embodiment 1 can statistically reduce the time taken from the increase in the necessary bandwidth of the network termination to the decision as to the increase by the network unit as compared with the conventional technique that decides the increase in the number of the cell slots at the end of the next frame. For example, when K=100 and L=50, the possibility is about ½ that the network unit 18 can make a decision on the increase in the number of cell slots at the end of the frame after the network termination increases its necessary bandwidth. When the network unit 18 cannot decide the increase in the number of the cell slots at the end of the frame after increasing the necessary bandwidth of the network termination, it makes the decision on the cell slots at the end of the next frame. Accordingly, the average time from the increase in the necessary bandwidth of the network termination to the decision of the increase in the number of cell slots by the network unit 18 is 1.0 frame time when K=100 and L=50.

Since the conventional technique makes the decision of the increase from one frame to two frame afterward, the mean time for making the decision is 1.5 frame time. Thus, the present embodiment 1 can reduce the time by 0.5 frame time as compared with the conventional technique. This effect can be improved by reducing K/L.

However, because of the fluctuations of the cells the user equipment outputs, it may output the valid cells consecutively, and hence K/L cannot be reduced extremely. Thus, the increasing threshold value is determined considering parameters such as the cell characteristics of the user equipment, the increase in the number of cell slots to be assigned to the network termination, etc.

As described above, the present embodiment 1 can statistically reduce the time taken from the increase in the necessary bandwidth by the network termination 11*a*, 11*b* or 11*c* to the decision about the increase in the number of the cell slots by the network unit 18. As a result, it offers an advantage of being able to statistically reduce the number of cells stored in the buffer memory in the network terminations 11*a*, 11*b* and 11*c*, and statistically reduce the cell transfer delay and the bursting tendency of the cells.

(2) Second, the case will be described where the bandwidth of the cells output from the user equipment 12*a* is decreased.

FIG. 3 is a diagram illustrating relationships between the necessary bandwidth of the network termination 11*a*, the number of assigned cell slots per frame of the network termination 11*a*, the total number of cells per frame the network unit 18 receives from the network termination 11*a*, the number of valid cells per frame output from the network termination 11*a* and the number of valid cells per frame the network unit 18 receives from the network termination 11*a*.

It is assumed in FIG. 3, that the initial value of the number of the assigned cell slots per frame of the network termination 11*a* is "100", the initial value of the total number of cells per frame the network unit 18 receives from network termination 11*a* is "100", the initial value of the number of valid cells per frame output from the network termination 11*a* is "80", and the initial value of the number of valid cells per frame the network unit 18 receives from network termination 11*a* is "80". For the convenience of explanation, it is further assumed that the number of cell slots assigned to the network termination 11*a* is either 100 or 50 cells per frame. In practice, however, more than two values can be defined as the number of the assigned cell slots.

As for the cell slots assigned to the network termination 11*a*, either a valid cell or idle cell of the network termination 11*a* are inserted into them without fail. Therefore, the number of the assigned cell slots per frame of the network termination 11*a* equals the total number of cells per frame the network unit 18 receives from the network termination 11*a* after time Z, where z is the delay time from the transmission of the cell by the network termination 11*a* to the reception of the cell by the network unit 18. Likewise, the number of the valid cells per frame of the network termination 11*a* equals the number of valid cells per frame the network unit 18 receives from the network termination 11*a* after the time Z. In addition, the graph of the number of valid cells per frame the network unit 18 receives from the network termination 11*a* illustrates a decreasing threshold value used for decreasing the number of cell slots to be assigned. The decreasing threshold value varies in accordance with the total number of cells per frame the network unit 18 receives from the network termination 11*a*.

As the bandwidth of the cells output from the user equipment 12*a* decreases, the bandwidth required by the network termination 11*a* reduces, and the number of valid cells per frame output from the network termination 11*a* reduces. In FIG. 3, it is assumed that the number of valid output cells per frame is reduced from "80" to "45" (FIG. 3(*d*)). In connection with this, the number of valid cells per frame the network unit 18 receives from the network termination 11*a* is also reduced from "80" to "45" after the time Z (FIG. 3(*e*)).

When the total number of cells per frame the network unit 18 receives from the network termination 11*a* is "100" (FIG. 3(*c*)), the decreasing threshold value is set at "70" (FIG. 3(*e*)). Let us assume in FIG. 3 that the number of valid cells per frame output from the network termination 11*a* reduces (FIG. 3(*d*)), and hence the number of valid cells per frame the network unit 18 receives from the network termination 11*a* becomes equal to or less than the decreasing threshold value (FIG. 3(*e*)), and the number of cell slots to be assigned is reduced (FIG. 3(*b*)), and that the delay time is Y from the time when the network termination 11*a* reduces the number of valid cells per frame to the time when it outputs the cells to the cell slots whose number is actually reduced (FIGS. 3(*a*) and 3(*b*)), then the number of the assigned cell slots per frame of the network termination 11*a* is reduced (FIG. 3(*b*)) when the time Y has elapsed after the number of valid cells per frame output from the network termination 11*a* is reduced to "45" (FIG. 3(*d*)). In FIG. 3, it is reduced to "50" which is held thereafter (FIG. 3(*b*)).

When the total number of cells the network unit 18 receives from the network termination 11*a* is "50" , the decreasing threshold value is set at "35". However, even if the number of valid cells received becomes less than "35", since the number of the assigned cell slots per frame is assumed to take one of the two values "50" and "100" , the number of the assigned cell slots per frame of the network termination 11*a* is not reduced. The decreasing threshold value is determined considering parameters such as the cell characteristics of the user equipment, the number of an increase in the cell slots for the network termination, etc.

(3) Next, the case will be described where the bandwidth of the cells output from the user equipment 12*a* is increased, and the increased state continues.

FIG. 4 is a diagram illustrating relationships between the necessary bandwidth of the network termination 11*a*, the number of assigned cell slots per frame of the network termination 11*a*, the total number of cells per frame the network unit 18 receives from the network termination 11*a*, the number of valid cells per frame output from the network termination 11*a* and the number of valid cells per frame the network unit 18 receives from the network termination 11*a*. The relationships are the same as those of FIG. 3.

It is assumed in FIG. 4 that the initial value of the number of the assigned cell slots per frame of the network termination 11*a* is "50", the initial value of the total number of cells per frame the network unit 18 receives from network termination 11*a* is "50", the initial value of the number of valid cells per frame output from the network termination 11*a* is "40", and the initial value of the number of valid cells per frame the network unit 18 receives from network termination 11*a* is "40".

When the bandwidth of the cells the user equipment 12*a* outputs increases, and continues the increased state, the bandwidth required by the network termination 11a increases, and continues the increased state (FIG. 4(a)).

When the bandwidth required by the network termination 11a increases, the number of the valid output cells per frame increases to the number of the cell slots assigned. In FIG. 4, the number of valid output cells per frame becomes "50" (FIG. 4(d)).

When the number of valid cells per frame output from the network termination 11a increases up to the number of the assigned cell slots (FIG. 4(d)), the number of consecutive valid cells the network unit 18 receives from the network termination 11a at the time when the decision section 23 makes its decision, exceeds the increasing threshold value. Thus, the network termination 11a is assigned an increasing number of the cell slots per frame in accordance with the principle as described above. In this case, the delay time is X from the increase in the number of valid cells per frame output from the network termination 11a to the actual output of the cells using the increased number of cell slots (FIGS. 4(d) and 4(b)). Thus, when the time X has elapsed after the number of valid cells per frame output from the network termination 11a increases, the number of the assigned cell slots per frame of the network termination 11a increases (FIG. 4(d) and 4(b)), and in conjunction with this, the number of valid cells per frame output from the network termination 11a also increases (FIG. 4(d)). After the additional time Z, the total number of cells per frame the network unit 18 receives from the network termination 11a increases (FIG. 4(c)) together with the number of valid cells in the frame (FIG. 4(e)).

In FIG. 4, it is assumed that the number of the assigned cell slots and the number of valid output cells per frame of the network termination 11a both become "100"(FIGS. 4(b) and 4(d)), and hence the total number of cells and the number of valid cells per frame the network unit 18 receives from the network termination 11a also become "100" after the time Z (FIGS. 4(c) and 4(d)). It is further assumed that when the total number of cells per frame the network unit 18 receives from the network termination 11a is 100, the decreasing threshold value is set at 80 cells (FIG. 4(e)).

Subsequently, when all the cells stored in the buffer memory of the network termination 11a have been transmitted, the number of valid cells per frame output from the network termination 11a is reduced (FIG. 4(d)). In this case, when the number of valid cells per frame the network unit 18 receives from the network termination 11a is greater than the decreasing threshold value (FIG. 4(e)), the number of the assigned cell slots is not reduced, holding this state thereafter. In FIG. 4, the number of valid cells per frame output from the network termination 11a becomes 90 (FIG. 4(d)), and hence the number of valid cells per frame the network unit 18 receives from the network termination 11a also becomes 90 after the time Z (FIG. 4(e)). Since it is greater than the decreasing threshold value 80, this state is maintained from then on.

As described above, the present embodiment 1 is configured such that as long as the number of cells per frame output from the network termination 11a is greater than the decreasing threshold value, the number of valid cells output from the network termination 11a does not repeat the increase and decrease. As a result, the present embodiment 1 can reduce the number of cells stored in the buffer memory, and statistically reduce the cell transfer delay and the bursting tendency of the cells.

FIG. 5 is a flowchart illustrating a dynamic bandwidth assignment method of the present embodiment 1. It is assumed in this flowchart that N network terminations are connected to the network unit 18 via the distributor 15.

First, waiting for the completion of a frame, the network unit 18 starts updating the assignment of the cell slots (step ST1).

Subsequently, the decision section 23 of the network unit 18 makes a decision as to whether the number of consecutive valid cells it receives from a first network termination at the decision time exceeds the increasing threshold value set in accordance with the total number of the cells per frame the network unit 18 receives from the first network termination (steps ST2 and ST3).

When the decision result is positive, the decision section 23 requests the cell slot assignment section 25 of the network unit 18 to increase the number of cell slots to be assigned to the first network termination (step ST4). In contrast, when the decision result is negative, the decision section 23 makes a decision as to whether the number of valid cells per frame the network unit 18 receives from the network termination is less than or equal to the decreasing threshold value set in accordance with the total number of the cells (step ST5).

When the decision result is positive, the decision section 23 requests the cell slot assignment section 25 to reduce the number of cell slots to be assigned to the first network termination (step ST6). When the decision result is negative, the decision section 23 requests the cell slot assignment section 25 to maintain the number of the cell slots to be assigned to the first network termination (step ST7). The foregoing operation is performed for the N network terminations (step ST8). After completing the process, the cell slot assignment section 25 updates the number of the cell slots to be assigned to each of the network terminations in response to the request from the network terminations (step ST9).

As for each of the network terminations, it has an internal buffer memory, writes the cells it receives from the user equipment into the buffer memory, reads the cells and supply them to the assigned cell slots to be output, and outputs an idle cell to an assigned cell slot when no cell is present in the buffer memory.

Embodiment 2

In the present embodiment 2, the network unit 18 operates such that it increases the number of the cell slots to be assigned to the network termination from which the network unit receives in a decision period a greater number of valid cells than a first threshold value that is set in accordance with the total number of cells the network unit receives from the network termination in the decision period, and that it decreases the number of the cell slots to be assigned to the network termination from which the network unit receives in a decision period a smaller number of valid cells than a second threshold value that is set in accordance with the total number of cells the network unit receives from the network termination in the decision period.

The threshold values that are set in accordance with the total number of cells the network unit receives from the network termination in the decision period include two types: an increasing threshold value for increasing the number of the cell slots; and a decreasing threshold value for decreasing the number of the cell slots. The increase or decrease in the number of the cell slots can be made either at every one frame interval or at every several frame interval. In the following description, it is assumed that the decision as to the increase or decrease in the number of the cell slots is made frame by frame. FIGS. 1A and 1B are applied to the present embodiment 2. Since the operation of the present embodiment 2 is the same as that of the embodiment 1 except when the bandwidth of the cells the user equipment 12a outputs increases, only the description thereof is made without describing the remaining operation.

The case will be described where the bandwidth of the cells the user equipment 12a outputs increases. Although the operation of the user equipment 12a in connection with the network termination 11a will be described in the following, the operation of the user equipment 12b and the network termination 11b and that of the user equipment 12c and the network termination 11c are the same.

FIG. 6 is a diagram illustrating relationships between the necessary bandwidth of the network termination 11a, the number of assigned cell slots per frame of the network termination 11a, the total number of cells per frame the network unit 18 receives from the network termination 11a, the number of valid cells per frame output from the network termination 11a and the number of valid cells per frame the network unit 18 receives from the network termination 11a. Their relationships are the same as those of FIG. 3. For convenience of explanation, it is further assumed that the number of cell slots assigned to the network termination 11a is either 100 or 50 cells per frame. In practice, however, more than two values can be defined as the number of cell slots to be assigned.

It is assumed in FIG. 6 that the initial value of the number of the assigned cell slots per frame of the network termination 11a is "150", the initial value of the total number of cells per frame the network unit 18 receives from network termination 11a is "50", the initial value of the number of valid cells per frame output from the network termination 11a is "40", and the initial value of the number of valid cells per frame the network unit 18 receives from network termination 11a is "40". In addition, the increasing threshold value is placed at "45" and "95", when the total number of cells per frame the network unit 18 receives from network termination 11a is "50" and "100", respectively.

When the bandwidth of the cells the user equipment 12a outputs is increased, and continues the increased state, the bandwidth required by the network termination 11a is increased, and continues the increased state.

When the bandwidth required by the network termination 11a is increased, the number of the valid output cells per frame is increases up to the number of the cell slots assigned (FIG. 6(d)). In FIG. 6, the number of valid output cells per frame becomes "50" (FIG. 6(d)). When the time Z has elapsed, the number of valid cells per frame the network unit 18 receives from the network termination 11a increases to "50", exceeding the increasing threshold value (FIG. 6(e)). Accordingly, the cell slot assignment section 25 of the network unit 18 increases the number of the cell slots to be assigned to the network termination 11a, so that the number of the assigned cell slots per frame of the network termination 11a is increased to "100" when the time X has elapsed (FIG. 6(b)).

When the number of the assigned cell slots per frame of the network termination 11a increases to "100", the number of valid cells per frame the network termination 11a outputs is increased up to "100" (FIG. 6(d)), and the total number of cells per frame the network unit 18 receives from the network termination 11a also increases to "100" when the time Z has elapsed (FIG. 6(c)). Thus, the number of valid cells per frame the network unit 18 receives from the network termination 11a also becomes "100" (FIG. 6(e)).

Subsequently, when all the cells stored in the buffer memory of the network termination 11a have been transmitted, the number of valid cells per frame output from the network termination 11a is assumed to be reduced to 90 cells, for example (FIG. 6(d)). Since the increasing threshold value is "95" when the total number of cells the network unit 18 receives from the network termination 11a is "100" (FIG. 6(e)), the number of the assigned cell slots per frame of the network termination 11a is not increased from the viewpoint of the threshold value. Besides, since the number of the assigned cell slots per frame is assumed to take one of the two values "50" and "100", the number of the assigned cell slots per frame of the network termination 11a is not increased even when the total number of the cells received exceeds "95". The increasing threshold value is determined considering parameters such as the cell characteristics of the user equipment, the number of an increase in the cell slots for the network termination, etc.

Since the operation when the bandwidth of the cells the user equipment 12a outputs is reduced is the same as that of the foregoing embodiment 1, the description thereof is omitted here. In addition, in the case where the bandwidth of the cells the user equipment 12a outputs is increased, and the increased state continues, since the operation is the same as that of the foregoing embodiment 1 except that the method of deciding the increase in the number of the assigned cell slots per frame of the network termination 11a is replaced by the decision method described in the present embodiment 2, the same effect as the foregoing embodiment 1 is achieved.

Thus, when the bandwidth of the cells the user equipment 12a outputs is increased, and the increased state continues, and when the number of valid cells per frame output from the network termination 11a is greater than the decreasing threshold value, the number of cells output from the network termination 11a does not repeat the increase and decrease. As a result, the present embodiment 2 can reduce the number of cells stored in the buffer memory, and statistically reduce the cell transfer delay and the bursting tendency of the cells.

Furthermore, since the network unit 18 sets both the increasing threshold value and decreasing threshold value in accordance with the total number of cells per frame the network unit 18 receives from the network termination in the present embodiment 2, the circuit can be used in common, enabling the circuit to be reduced in its size.

FIG. 7 is a flowchart illustrating a dynamic bandwidth assignment method of the present embodiment 2. It is assumed in this flowchart that N network terminations are connected to the network unit 18 via the distributor 15.

First, waiting for the completion of a frame, the network unit 18 starts updating the assignment of the cell slots (step ST11). Subsequently, the decision section 23 of the network unit 18 makes a decision as to whether the number of valid cells per frame the network unit 18 receives from a first network termination exceeds the increasing threshold value set in accordance with the total number of the cells per frame the network unit 18 receives from the first network termination (steps ST12 and ST13).

When the decision result is positive, the decision section 23 requests the cell slot assignment section 25 of the network unit 18 to increase the number of cell slots to be assigned to the first network termination (step ST14). In contrast, when the decision result is negative, the decision section 23 makes a decision as to whether the number of valid cells per frame the network unit 18 receives from the network termination is less than or equal to the decreasing threshold value set in accordance with the total number of the cells (step ST15).

When the decision result is positive, the decision section 23 requests the cell slot assignment section 25 to reduce the number of cell slots to be assigned to the first network termination (step ST16). When the decision result is negative, the decision section 23 requests the cell slot assignment section 25 to maintain the number of the cell slots to be assigned to the first network termination (step ST17). The foregoing operation is performed for the N network terminations (step ST18). After completing the process, the cell slot assignment section 25 updates the number of the cell slots to be assigned to each of the network terminations in response to the request from the network terminations (step ST19).

As for each of the network terminations, it has an internal buffer memory, writes the cells it receives from the user equipment into the buffer memory, reads the cells and supply them to the assigned cell slots to be output, and outputs an idle cell to an assigned cell slot when no cell is present in the buffer memory.

What is claimed is:

1. A dynamic bandwidth assignment system including a network unit configured to carry out cell slot assignment, and a network termination unit configured to transmit cells to the network unit by cell slots assigned by the network unit, said network unit comprising:
   a detection unit configured to detect valid cells and idle cells said network unit receives from said network termination unit;
   a decision unit configured to output a decision result on a cell slot assignment to the network termination unit based on the detection results by said detection unit; and
   a cell slot assignment unit configured to control the cell slot assignment to the network termination unit in response to the decision result of said decision unit,
   wherein said decision unit is configured to supply the decision result to said cell slot assignment unit when a number of valid cells said network unit receives from said network termination unit in a decision period becomes less than a second predetermined threshold value, and wherein said cell slot assignment unit is configured to reduce a number of the cell slots to be assigned to said network termination unit in response to the decision result.

2. A dynamic bandwidth assignment system including a network unit configured to carry out cell slot assignment, and a network termination unit configured to transmit cells to the network unit by cell slots assigned by the network unit, said network unit comprising:
   a detection unit configured to detect valid cells and idle cells said network unit receives from said network termination unit;
   a decision unit configured to output a decision result on a cell slot assignment to the network termination unit based on the detection results by said detection unit; and
   a cell slot assignment unit configured to control the cell slot assignment to the network termination unit in response to the decision result of said decision unit,
   wherein said decision unit is configured to supply the decision result to said cell slot assignment unit when a number of consecutive valid cells said network unit receives from said network termination unit exceeds a first predetermined threshold value, and wherein said cell slot assignment unit is configured to increase the number of the cell slots to be assigned to said network termination unit in response to the decision result, and
   wherein said decision unit is configured to determine the first threshold value in accordance with the total number of cells said network unit receives from said network termination unit in a decision period.

3. A dynamic bandwidth assignment system including a network unit configured to carry out cell slot assignment, and a network termination unit configured to transmit cells to the network unit by cell slots assigned by the network unit, said network unit comprising:
   a detection unit configured to detect valid cells and idle cells said network unit receives from said network termination unit;
   a decision unit configured to output a decision result on a cell slot assignment to the network termination unit based on the detection results by said detection unit; and
   a cell slot assignment unit configured to control the cell slot assignment to the network termination unit in response to the decision result of said decision unit,
   wherein said decision unit is configured to supply the decision result to said cell slot assignment unit when a number of valid cells said network unit receives from said network termination unit in a decision period becomes less than a second predetermined threshold value, and wherein said cell slot assignment unit is configured to reduce a number of the cell slots to be assigned to said network termination unit in response to the decision result, and
   wherein said decision unit is configured to determine the second threshold value in accordance with the total number of cells said network unit receives from said network termination unit in the decision period.

4. A dynamic bandwidth assignment system including a network unit configured to carry out cell slot assignment, and a network termination unit configured to transmit cells to the network unit by cell slots assigned by the network unit, said network unit comprising:
   a detection unit configured to detect valid cells and idle cells said network unit receives from said network termination unit;
   a decision unit configured to output a decision result on a cell slot assignment to the network termination unit based on the detection results by said detection unit; and
   a cell slot assignment unit configured to control the cell slot assignment to the network termination unit in response to the decision result of said decision unit,
   wherein said decision unit is configured to supply the decision result to said cell slot assignment unit when a number of valid cells said network unit receives from said network termination unit in a decision period exceeds a first predetermined threshold value, and wherein said cell slot assignment unit is configured to increase a number of the cell slots to be assigned to said network termination unit in response to the decision result, and
   wherein said decision unit is configured to determine the first threshold value in accordance with the total number of cells said network unit receives from said network termination unit in the decision period.

5. A dynamic bandwidth assignment method in a network unit comprising:
   detecting valid cells and idle cells said network unit receives from a network termination;
   producing a decision result on a cell slot assignment to the network termination unit based on the detection result; and controlling cell slot assignment to the network termination unit in response to the decision result, and wherein when a number of the valid cells said network unit receives from said network termination unit becomes less than a second predetermined threshold value, the step of controlling cell slot assignment decreases the number of the cell slots to be assigned to said network termination unit in response to the decision result.

6. A dynamic bandwidth assignment method in a network unit comprising:

detecting valid cells and idle cells said network unit receives from a network termination;

producing a decision result on a cell slot assignment to the network termination unit based on the detection result; and controlling cell slot assignment to the network termination unit in response to the decision result, wherein when a number of consecutive valid cells said network unit receives from said network termination unit exceeds a first predetermined threshold value, the step of controlling cell slot assignment increases the number of the cell slots to be assigned to said network termination unit in response to the decision result, and wherein the first threshold value is determined in accordance with the total number of cells said network unit receives from said network termination unit in the decision period.

7. A dynamic bandwidth assignment method in a network unit comprising:

detecting valid cells and idle cells said network unit receives from a network termination;

producing a decision result on a cell slot assignment to the network termination unit based on the detection result; and controlling cell slot assignment to the network termination unit in response to the decision result, wherein when a number of the valid cells said network unit receives from said network termination unit becomes less than a second predetermined threshold value, the step of controlling cell slot assignment decreases the number of the cell slots to be assigned to said network termination unit in response to the decision result, and wherein the second threshold value is determined in accordance with the total number of cells said network unit receives from said network termination unit in the decision period.

8. A dynamic bandwidth assignment method in a network unit comprising:

detecting valid cells and idle cells said network unit receives from a network termination;

producing a decision result on a cell slot assignment to the network termination unit based on the detection result; and controlling cell slot assignment to the network termination unit in response to the decision result, wherein when a number of the valid cells said network unit receives from said network termination unit exceeds a first predetermined threshold value, the step of controlling cell slot assignment increases the number of the cell slots to be assigned to said network termination unit in response to the decision result, and wherein the first threshold value is determined in accordance with the total number of cells said network unit receives from said network termination unit in the decision period.

\* \* \* \* \*